S. J. WELCH.
DIRIGIBLE LAMP.
APPLICATION FILED MAR. 2, 1916.

1,247,188.

Patented Nov. 20, 1917.
2 SHEETS—SHEET 1.

Inventor
Samuel J. Welch
By his Attorneys
Brindle, Wright & Snell

S. J. WELCH.
DIRIGIBLE LAMP.
APPLICATION FILED MAR. 2, 1916.
1,247,188.
Patented Nov. 20, 1917.
2 SHEETS—SHEET 2.
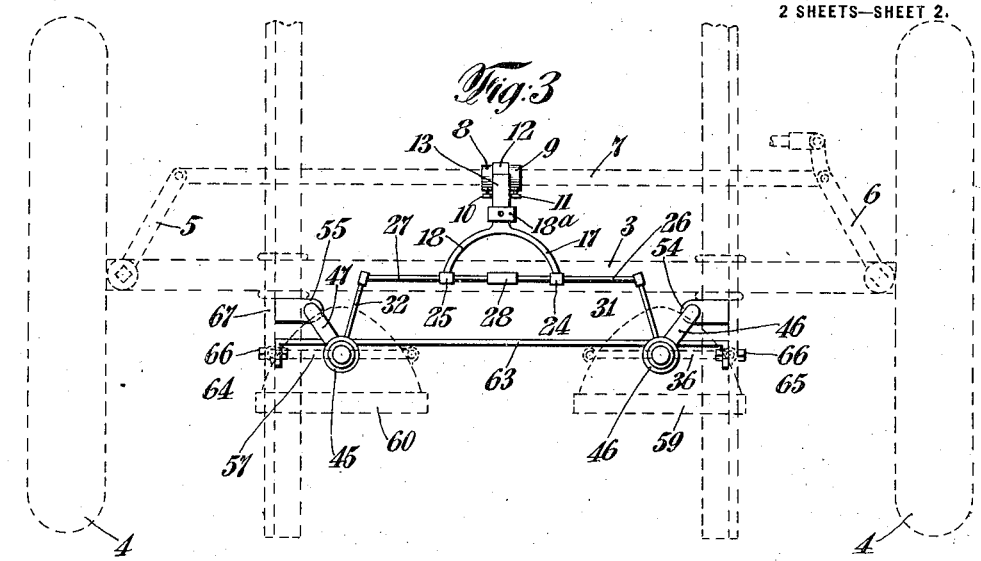
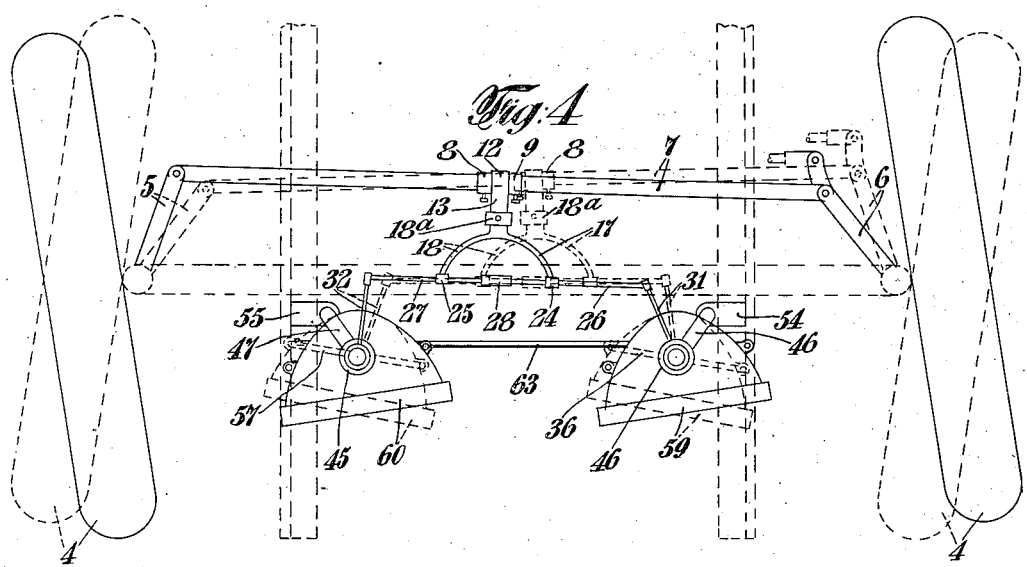
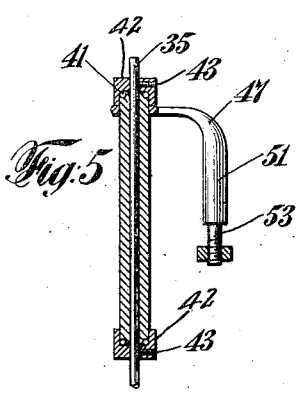
Inventor
Samuel J. Welch
By his Attorneys

UNITED STATES PATENT OFFICE.

SAMUEL J. WELCH, OF TROY, PENNSYLVANIA.

DIRIGIBLE LAMP.

1,247,188.  Specification of Letters Patent.  Patented Nov. 20, 1917.

Application filed March 2, 1916. Serial No. 81,592.

*To all whom it may concern:*

Be it known that I, SAMUEL J. WELCH, of Troy, in the county of Bradford and in the State of Pennsylvania, have invented a certain new and useful Improvement in Dirigible Lamps, and do hereby declare that the following is a full, clear, and exact description thereof.

My invention relates to means for directing the light projecting means on vehicles, especially automobiles.

The object of my invention is to provide an apparatus of this kind in which the means for throwing light upon the roadway in front of the vehicle may be directed so as to illuminate the part of the roadway in front of the vehicle while it is going around curves, and so as to avoid throwing the light in the eyes of those driving vehicles in the opposite direction when going around curves. A further object of my invention is to provide such a device, which operates entirely automatically in the driving of the vehicle.

While my invention is capable of embodiment in many different forms, for the purpose of illustration I shall show only one form thereof in the accompanying drawings, in which, Figure 1 is a front elevation of an apparatus made in accordance with my invention;

Fig. 3 is a plan view of the same, showing the parts in one position;

Fig. 4 is a similar view showing the parts in another position; and

Fig. 5 is an enlarged vertical section of a detail.

Figure 1:
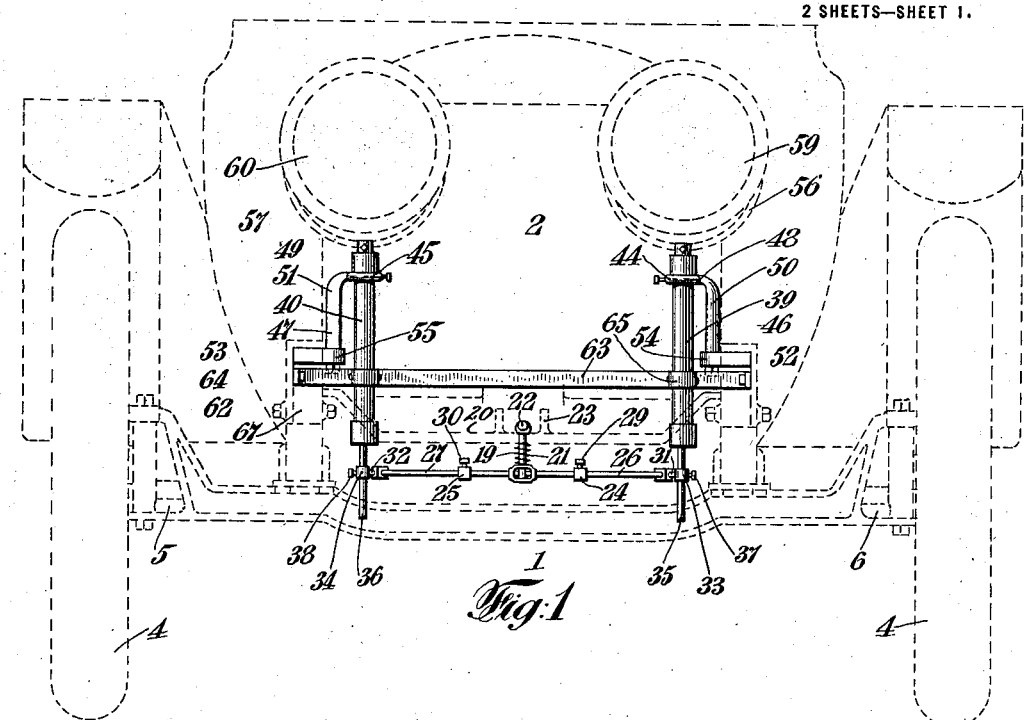
Figure 2:
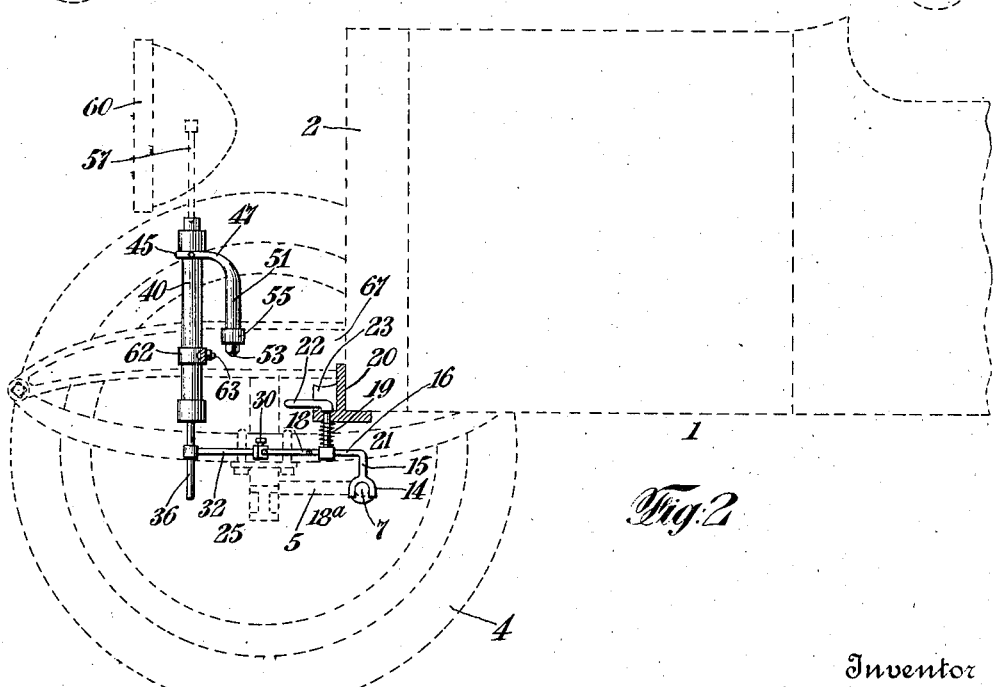
Fig. 2 is a longitudinal vertical section of the same.

In the drawings I have shown diagrammatically an automobile 1 having at the front thereof a radiator 2, a front axle 3, front wheels 4, levers 5 and 6 for guiding the front wheels, and a bar 7 connecting the levers 5 and 6 for the purpose of moving the same. Located on this bar 7 are two collars 8 and 9, which are secured to said bar by set screws 10 and 11. Between the two collars 8 and 9 there is located a rear end 12 of a yoke 13. The rear end 12 of said yoke is provided with a bearing 14 which fits loosely over the bar 7 between the collars 8 and 9, an upwardly directed portion 15 to enable the yoke to have ample clearance over the front axle 3, a forwardly directed portion 16 above said axle 3 and two arms 17 and 18. On the forwardly directed portion 16 there is provided a loose collar 18ª having rotatably supported therein an upwardly directed rod 19 attached thereto, which extends through a hole in a bracket 20 attached to the radiator 2 of the automobile. A spring 21 surrounds the rod 19 and normally presses the yoke 13 downwardly so as to cause the bearing 14 to engage with the bar 7. Said bar 19 has, however, at its upper end, a handle 22 which may be used for moving the rod 19 upwardly so as to disengage the bearing 14 from the bar 7 and maintain the parts thus disengaged by moving the handle into a notch 23 located on the bracket. The two arms 17 and 18 are provided respectively with sleeves 24 and 25 to receive respectively rods 26 and 27, which are connected together by a turn-buckle 28 arranged to move the two ends of the rods 26 and 27, together or away from each other, as desired, to adjust the angular positions of the lights to be thrown on the roadway as hereinafter described. Set screws 29 and 30 are provided in the sleeves 24 and 25 to securely fasten the rods 26 and 27 to the yoke 13. The rods 26 and 27 are at their other ends connected respectively to lever arms 31 and 32, the other ends of said levers having sleeves 33 and 34 to receive vertical rods 35 and 36. Set screws 37 and 38 securely fasten said rods 35 and 36 to the sleeves 33 and 34. The rods 35 and 36 pass upwardly through tubes 39 and 40 having ball bearings 41 on their ends, said ball bearings being equipped with caps 42 secured to the rods 35 and 36 by set screws 43. Around the tubes 39 and 40 are located sleeves 44 and 45 which are carried respectively by arms 46 and 47 having horizontal portions 48 and 49 and vertical portions 50 and 51, which are provided with lower screw-threaded ends 52 and 53, which pass through and are secured in lamp sockets 54 and 55 of the usual type provided on automobiles for holding lamps. At their upper ends the rods 35 and 36 are provided with yokes 56 and 57 held in place by set screws 58, said yokes 56 and 57 carrying lamps 59 and 60 in the usual way, and of any desired type that may be found useful in connection with the operation of vehicles. The tubes 39 and 40 are held in position by means of clamping straps 61 and 62, which pass through a bar 63 having offset portions 64 and 65 at its two ends, which are adapted to be fastened by bolts 66 to a forwardly directed frame 67, such as that usually found on automobiles.

In the operation of my invention, assuming that the apparatus is being operated by night, when it is desired to utilize the light from the lamps 59 and 60, the handle 22 will be locked in its lowermost position so that the bearing 14 engages with the bar 7. When now the car is driven forwardly on a straight road, the lights from the lamps 59 and 60 shine directly in front of the automobile, but when the car begins to make a turn, the lamps 59 and 60 turn to a corresponding degree, and thus throw their lights immediately on the part of the curved roadway which the car is to follow in its turning movement. At the same time, owing to the turning movement of the lamps 59 and 60, there is no longer any danger due to the throwing of the lights in the faces of the drivers of automobiles coming in the opposite direction around the curve. It will be noted that this operation of the lamps 59 and 60, so as to turn according to the extent of the turning movement of the car, is carried out entirely automatically, and without any special effort or additional motions on the part of the driver. On the other hand, when it is desired not to utilize the lamps 59 and 60, as for example, when the car is to be operated only in the day time for a considerable period, the turning movement of the lamps 59 and 60 can be discontinued by merely lifting the handle 22 until it falls within the notch 23, whereupon the bearing 14 will be lifted above the collars 8 and 9 so that the yoke 13 is no longer moved by the movement of the bar 7.

While I have described my invention above in detail, I wish it to be understood that many changes may be made therein without departing from the spirit of my invention.

I claim:

1. In combination, a vehicle, having dirigible wheels and a steering rod connecting the same, a vehicle lamp, means to turn the same with the turning of the vehicle, connected to the steering rod of the vehicle and bodily movable out of engagement therewith, and manually adjustable means to disconnect the lamp turning means from the steering devices and hold the latter in inoperative position, comprising a spring-pressed hand-operated rod.

2. In a device of the class described, a steering rod, a member freely movable into and out of engagement with said rod, a movably mounted vehicle lamp connected to said member, and means for moving said member out of operative position.

3. In a device of the class described, a pair of vehicle lamps, a rod connecting the same, a link pivotally mounted upon said rod, a steering rod, said link being freely movable into and out of engagement with said rod, and means for moving said link about its pivot to break said last mentioned connection.

4. In a device of the class described, a pair of vehicle lamps, a rod connecting the same, a link pivotally mounted upon said rod, a steering rod having a detachable connection with said link, and a catch mounted upon said link adapted to engage the vehicle frame to hold said link out of operative position.

5. In combination with the side frames of a vehicle, a bar extending between said frames, tubes attached to said bar, lamp supporting spindles journaled in said tubes, and means for turning said spindles responsive to changes in direction of the vehicle wheels.

6. In combination, a pair of vehicle lamps, a sectional rod connecting said lamps, an adjustable connection between said sections, a steering rod, and a yoke engaging said steering rod and having arms adjustably attached to each of said sections.

7. In combination, a pair of vehicle lamps, a sectional rod connecting said elements, an adjustable connection between said sections, a steering rod, a yoke adjustably engaging said steering rod and having arms adjustably attached to each of said sections, and means for holding said yoke out of engagement with said steering rod.

In testimony that I claim the foregoing I have hereunto set my hand.

SAMUEL J. WELCH.